A. Mennel,
Artificial Leg,
No. 2,218. Reissued Apr. 3, 1866.
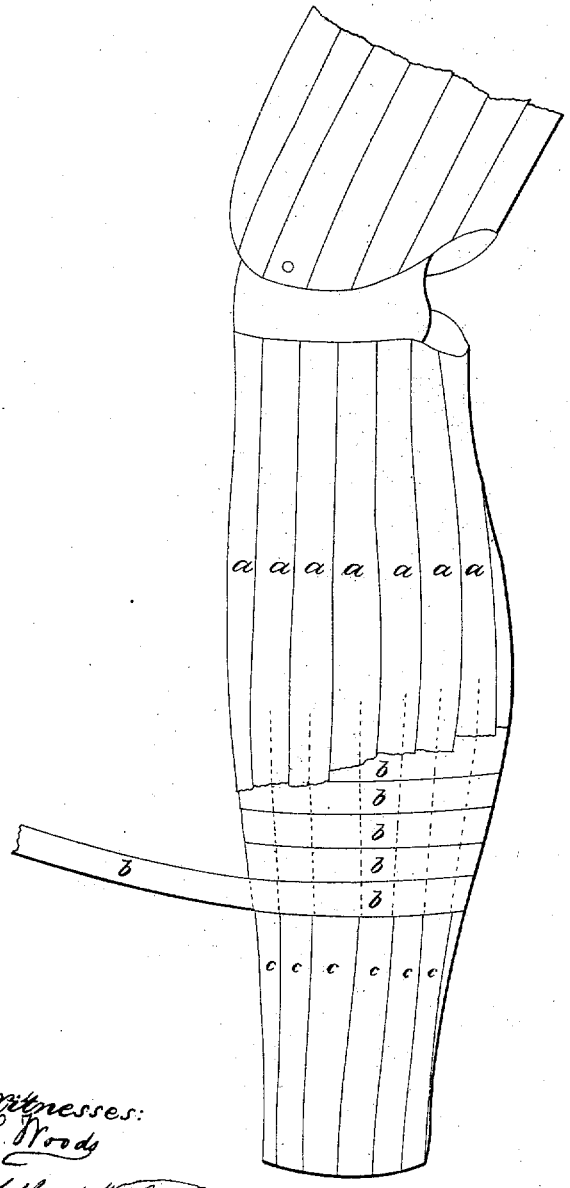
Witnesses:
W. L. Woods
Arthur de Wyl Eaton
Inventor:
Anton Mennel
AM. PHOTO-LITHO. CO. N.Y. (OSBORNE'S PROCESS.)

UNITED STATES PATENT OFFICE.

ANTON MENNEL, OF NEW YORK, N. Y.

IMPROVEMENT IN ARTIFICIAL LIMBS.

Specification forming part of Letters Patent No. 45,511, dated December 20, 1864; Reissue No. 2,218, dated April 3, 1866.

*To all whom it may concern:*

Be it known that I, ANTON MENNEL, of the city, county, and State of New York, have invented a new and useful Improvement in Artificial Limbs; and I do hereby declare that the following is a full, clear, and exact description thereof, which will enable others skilled in the art to make and use the same, reference being had to the accompanying drawings, which represent a side elevation of this invention.

The nature of my invention consists in the construction of the shell of artificial limbs of two or more layers of wood, formed of thin strips laid crosswise to each other, and brought in the proper form or shape in such a manner that a shell is obtained of great lightness, superior durability, and symmetrical in form, resembling as nearly as possible the shape of the natural limb to be replaced.

In preparing the shells of my artificial limbs I use the toughest and most flexible wood I can procure, and cut the same into strips *a b c*, suitable in length, width, and thickness for the limb to be made. Of these strips I form two or more layers, *f*, *e*, and *d*, one above the other, by uniting the single strips by means of suitable cement and pressing them into the requisite form by steam and suitable machinery. The strips of the inner shell, *f*, and also those of the outer shell, *d*, if such is used, are varied in width or gored, so that when they are united a shell of the desired form will be obtained. The strips *b* of the middle layer, *e*, are united so as to form one unbroken piece; or a single strip of sufficient length is selected and wrapped in a spiral form around the inner shell, *f*, conforming to the shape of the limb. Great care must be taken in determining the manner in which the strips of the shells *f* and *d* are gored, and a plaster cast of the natural limb may be used with advantage in determining their form.

By placing the strip or strips *b* crosswise to the strips *a* and *e*, great strength is imparted to the whole structure, and a shell is obtained which is light, durable, and as near as possible in the form of the natural limb to be replaced or mated.

What I claim as new, and desire to secure by Letters Patent, is—

Constructing the shell of an artificial limb of two or more layers of wood, each composed of one or more strips placed crosswise to each other, substantially in the manner and for the purpose herein set forth.

The above specification signed by me this 29th day of January, 1866.

ANTON MENNEL.

Witnesses:

E. HAUFF,

W. HAUFF.